United States Patent

Bergmann et al.

Patent Number: 5,885,449
Date of Patent: Mar. 23, 1999

[54] APPARATUS FOR REMOVING MICROBES FROM FLOWING MEDIA, SUCH AS WATER

[75] Inventors: Karl-Heinz Bergmann, Hösbach-Feldkahl, Germany; Armin Rammensee, Heimbuchenthal, Germany

[73] Assignee: Eisenwerke Fried.Wilh.Duker GmbH & Co., Karlstadt, Germany

[21] Appl. No.: 853,466

[22] Filed: May 9, 1997

[30] Foreign Application Priority Data

May 9, 1996 [DE] Germany ............ 296 08 441 U

[51] Int. Cl.$^6$ .................. C02F 1/32; A61L 2/10
[52] U.S. Cl. ........... 210/198.1; 210/748; 422/24; 422/186.3; 250/431; 250/436
[58] Field of Search ............... 210/198.1, 748, 210/251; 422/24, 186.3; 250/431, 436

[56] References Cited

U.S. PATENT DOCUMENTS

| | | |
|---|---|---|
| 4,267,455 | 5/1981 | Keller . |
| 4,728,368 | 3/1988 | Pedziwiatr . |
| 4,968,891 | 11/1990 | Jhawar . |
| 5,624,573 | 4/1997 | Wiesmann . |

FOREIGN PATENT DOCUMENTS

| | | |
|---|---|---|
| 266 792 | 11/1968 | Austria . |
| 0 023 892 | 2/1981 | European Pat. Off. . |
| 0 602 505 | 6/1994 | European Pat. Off. . |
| 0 643 016 | 3/1995 | European Pat. Off. . |
| 1150563 | 1/1958 | France . |
| 26 16 383 | 10/1976 | Germany . |
| 27 04 142 | 9/1977 | Germany . |
| 28 35 571 | 2/1980 | Germany . |
| 37 10 555 | 11/1988 | Germany . |
| 40 33 792 | 4/1992 | Germany . |
| 43 05 227 | 2/1993 | Germany . |
| 43 21 460 | 6/1994 | Germany . |
| 29505952.4 | 6/1995 | Germany . |
| 44 17 139 | 11/1995 | Germany . |
| 44 30 231 | 2/1996 | Germany . |
| WO95/19188 | 7/1995 | WIPO . |

OTHER PUBLICATIONS

"Keimreduktion durch UV–Bestrahlung", Peter Gelzhauser, Umwelt & Technik, Sep. 1988, pps. 8, 10 and 12.

Primary Examiner—Thomas M. Lithgow
Attorney, Agent, or Firm—Jacobson, Price, Holman & Stern, PLLC

[57] ABSTRACT

An apparatus for removeing microbes from flowing media, such as water, has an essentially cylindrical container, inside of which there is a reaction chamber with UV radiators arranged on a concentric circle, and it also has inlet and outlet openings for the medium to flow through the reaction chamber in a direction parallel to the cylinder axis and on a path maximizes exposure of the medium to the UV radiation.

6 Claims, 2 Drawing Sheets

APPARATUS FOR REMOVING MICROBES FROM FLOWING MEDIA, SUCH AS WATER

BACKGROUND OF THE INVENTION

1. Field of the Invention

The present invention relates to an apparatus for removing microbes from flowing media, such as water. The apparatus has an essentially cylindrical container, inside of which there is a reaction chamber with UV radiators arranged on the circumference of a concentrically arranged dividing circle, and which has at least one inlet and one outlet opening for the medium which flows through the reaction chamber in a direction parallel to the cylinder axis.

2. Description of the Related Art

In a known apparatus of this kind (DE PS 28 51 013), the reaction chamber is in the form of a ring-shaped space which surrounds an outlet pipe passing through the center of the container and which contains the UV radiators that run parallel to the axis. The medium enters the ring space through an inlet opening and flows along the radiators and the outside of the outlet pipe until it reaches the end of the ring space where the orifice of the central outlet pipe that leads to the outlet opening is located.

In this arrangement, it has proven to be a disadvantage that, subsequent to the irradiation which occurs during the passage through the ring space, the subject medium has to traverse a considerable distance within the container, practically corresponding to the distance from the inlet to the outlet orifice of the central outlet pipe, without exposure to irradiation. Thus, much of the interior space of the apparatus remains unused, without even mentioning the frictional forces which necessitate the expenditure of additional energy when pumping media through the apparatus.

SUMMARY OF THE INVENTION

The objective of the present invention is to further develop the apparatus of the kind that was named at the beginning, with the aim of achieving a more compact configuration requiring a smaller amount of energy to operate the apparatus.

The apparatus according to the invention in which this objective is accomplished is in essence distinguished by the fact that the reaction chamber is arranged at the center of the container and the UV radiators extend from an outlet compartment, which is immediately connected with an outlet opening located on one side at about the middle of the container, all the way through the reaction chamber and into an inlet compartment which is immediately adjacent to an inlet opening located on the opposite side at about the middle of the container.

In an apparatus of this kind it proves to be of advantage that the medium reaches the active zone of the UV radiators within a relatively short distance from the inlet opening of the container and that it exits from the container in the same manner, i.e., passing through the outlet opening in effect immediately after leaving the active zone. Thus, the space needed for transporting the medium inside the container is minimized, and the efficacy of the treatment of the medium is increased.

As a further benefit, this arrangement has proven to be optimally suited for controlling the flow in the reaction chamber by providing inside the reaction chamber and transverse to the container axis at least one sheet metal plate that the UV radiators pass through and which has perforations of variable size, respectively of variable distance from each other. By selecting an appropriate combination of hole size and distance, it is possible to optimize the flow rate per cross-sectional area in each respective part of the plate.

Appropriately, the perforated plate is configured as the combination of a central perforated disk and at least one perforated ring of complementary inner diameter that surrounds the central disk. In this practical way, it is possible to select different optimized passage cross-sections for the central disk and the ring.

It is very beneficial that the radius of the central perforated disk equals the perimeter radius on which the axes of the UV radiators are located. This makes it possible to hold the UV radiators on one side by the rim of the central disk and on the other side by the ring.

In a very advantageous further development of the apparatus according to the invention, provision is made for a drive mechanism to move the perforated plate(s) axially and thereby clean the UV radiators. It is suitable for this purpose to attach a wiping device to the perforated plate(s).

It has proven to be practical if the container is closed by a cover plate that serves as the base mount for all of the UV radiators. This ensures that all UV radiators are lifted and removed together when the cover is unlocked and taken off.

For the same reason, it is particularly beneficial that the drive unit that is connected with and serves to move the perforated plate(s) for cleaning the UV radiators is also mounted on the cover plate. In case of maintenance work, this affords the possibility to lift and remove the entire drive aggregate together with the perforated plate(s).

BRIEF DESCRIPTION OF THE DRAWING

Additional details, advantages, and characteristic features of the invention will be pointed out in the following description which relates to the attached drawing, wherein, specifically.

DETAILED DESCRIPTION OF THE PREFERRED EMBODIMENT

Figure 1:
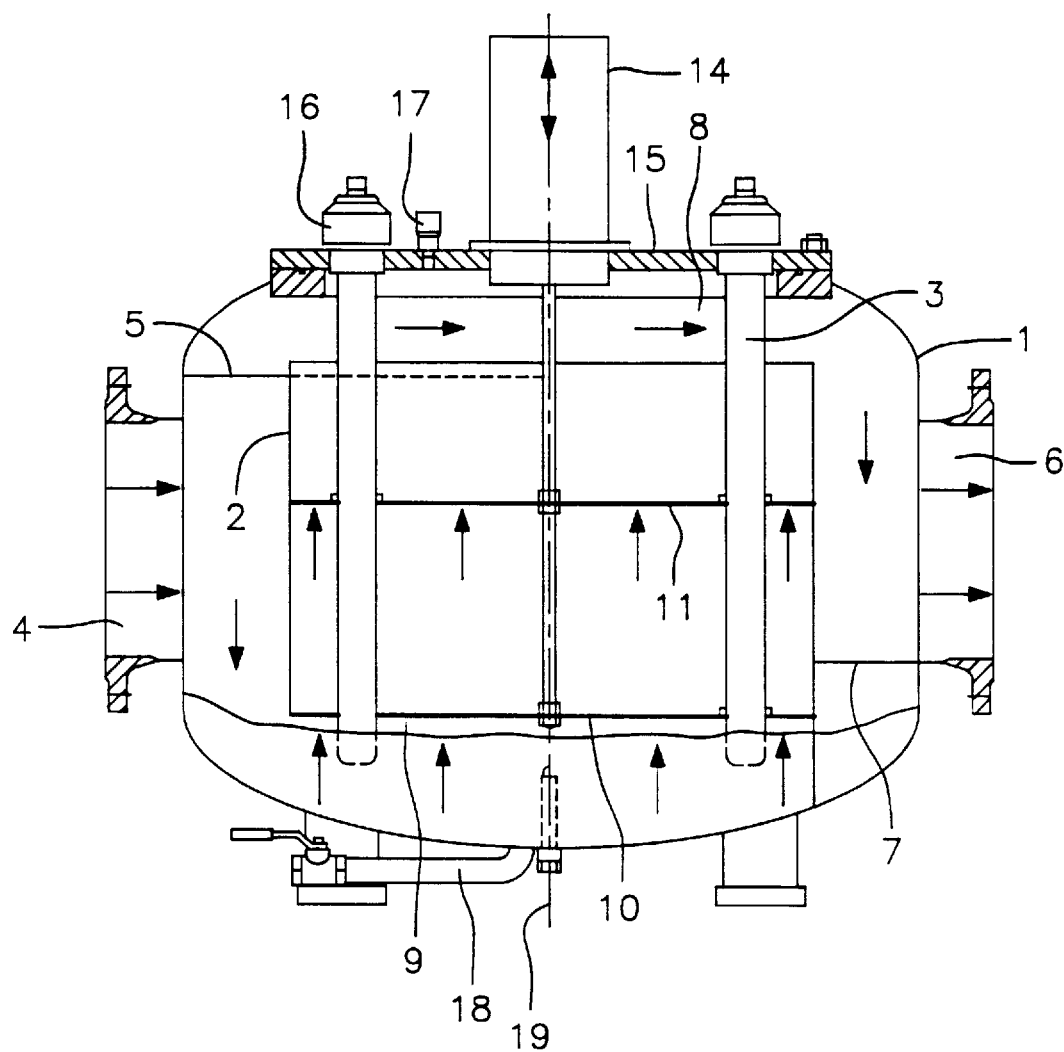
FIG. 1 presents a schematic side view, partially in cross-section, of an apparatus according to the invention.

As can be seen in the drawing, the illustrated apparatus for removing microbes from flowing media such as water comprises a substantially cylindrical container 1, inside of which there is a reaction chamber 2 with UV radiators 3 arranged on the perimeter of a dividing circle that is concentric with the container. Each UV radiator 3 comprises in a conventional manner the actual tube-shaped radiator which is surrounded by a protective quartz tube. The reaction chamber 2 which, like the container 1, is essentially in the shape of a cylinder, is mounted on the side of the inlet opening 4 through an upper wall 5 to the inside of container 1, and on the diametrically opposite side in the vicinity of the outlet opening 6 in an analogous manner through a lower wall 7. As can be seen from FIG. 1, the reaction chamber 2 is arranged in the center of container 1. The UV radiators 3 extend through an outlet compartment 8, which is connected directly with the outlet opening 6 located on one side and at about the middle of the container. In addition, they extend through the reaction chamber 2 and into the inlet compartment 9 which immediately adjoins the inlet opening 4 located on the other side and at about the middle of the container. The arrows in FIG. 1 illustrate the shortness of the flow passage traversed by the media from the inlet opening 4 to the outlet opening 6.

Figure 2:
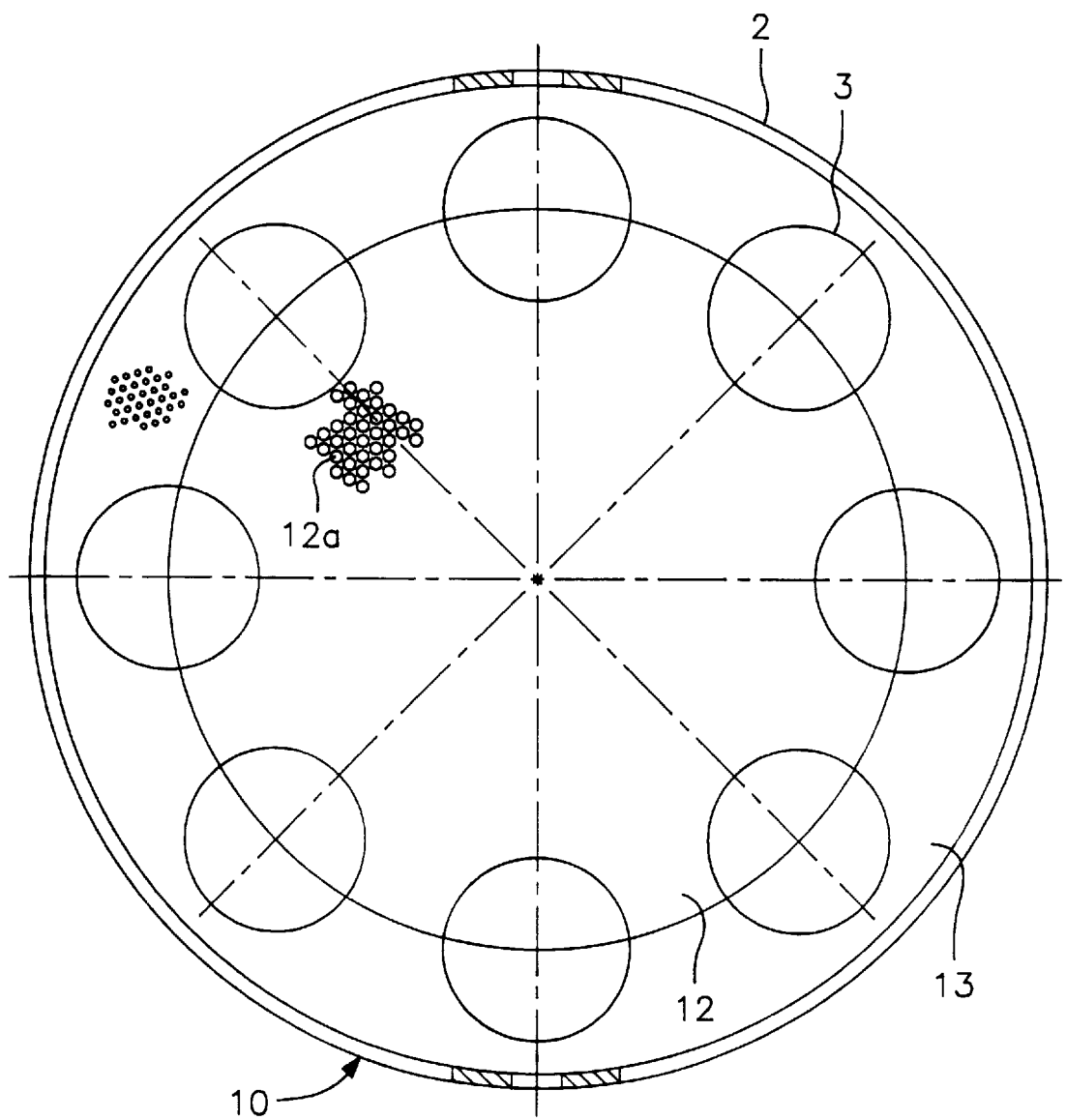
FIG. 2 presents in a very schematic manner a horizontal cross-section through the central reaction chamber with the transversely positioned perforated sheet metal plate.

To control the flow through the reaction chamber 2, the latter is provided with two perforated sheet metal plates 10 and 11, respectively, which extend transversely to the container axis and through which the UV radiators 3 are passing. These perforated sheet metal plates 10, 11 are provided with holes 12a, as seen in FIG. 2, of variable size, respectively of variable distance from each other. By selecting an appropriate combination of hole size and distance, it is possible to optimize the flow rate per cross-sectional area in each respective part of the plate.

As shown in FIG. 2, each perforated sheet metal plate is configured as the combination of a central perforated disk 12 and at least one perforated ring 13 of complementary inner diameter which surrounds the central disk 12. In this exceptionally simple manner, it is possible to select for the central disk an optimized flow passage cross-section different from the ring. The radius of the central perforated disk 12, as seen in FIG. 2, equals the perimeter radius on which the axes of the UV radiators 3 are located. This makes it possible to hold the UV radiators on one side by the rim of the central disk and on the other side by the ring.

As shown in FIG. 1, a drive mechanism 14 is provided for moving the perforated plates 10, 11 and thereby cleaning the UV radiators. For this purpose, the perforated plates 10, 11 include, in a suitable manner, a wiping device which is not illustrated in detail.

In accordance with FIG. 1, the container 1 has a cover plate 15 which is bolted to the rim of an opening of container 1. On this cover plate 15, all of the UV radiators 3 are mounted, so that when the cover is unfastened and taken off, the UV radiators are lifted and removed together from container 1. The same applies to the drive unit 14 which serves to move the perforated plate(s) for cleaning the UV radiators 3.

As shown in detail in FIG. 1, each of the UV radiators is connected with a screw mount 16 to cover plate 15, as is an automatic vent 17. To completely drain container 1 when needed, there is a drain pipe 18 at the lowest point of the container. The intensity of the UV radiation may be determined with a UV sensor 19 which is also provided in the bottom part of container 1.

We claim:

1. An apparatus for removing microbes from flowing water, said apparatus comprising a substantially cylindrical container (1), defining an axis, inside of said container there is a reaction chamber (2) with UV radiators (3) that are arranged on the perimeter of a circle which is concentrically positioned with respect to the cylindrical container, and said container has at least one inlet and one outlet opening (4, 6) for the water, means for causing the water to flow parallel to the container axis through the reaction chamber (2), said apparatus further comprising:

a) the reaction chamber (2) is located at the center of the container (1), and b) the UV radiators (3) extend from an outlet compartment (8) which is immediately connected to an outlet opening (6) located on one side of the container and at about the middle of the container, through the reaction chamber (2) all the way into an inlet compartment (9) which is immediately adjacent to an inlet opening (4) on the other side of the container and at about the middle of the container; and c) at least one perforated sheet metal plate (10, 11), having a cross-sectional area, which is located inside said reaction chamber (2) and being oriented transverse to the container axis, said at least one plate having holes therein, said holes being of a selected size and distance from each other in a first area of the said plate and said holes being of a different size and distance from each other in a second area of the plate, wherein with the appropriate combination of hole size and distance from each hole in each area, the flow rate can be optimized for each respective area of the cross-sectional area.

2. The apparatus according to claim 1, wherein each perforated sheet metal plate (10, 11) is formed by the combination of a central perforated disk (12), as the first area and at least one perforated ring (13) of complementary inner diameter that surrounds the central disk, as the second area.

3. The apparatus according to claim 2, wherein the diameter of the perforated disk (12) equals the diameter of the circle on which the axes of the UV radiators (3) are located.

4. The apparatus according to claim 1, wherein a drive mechanism (14) is provided for moving the perforated plates (10, 11) along the UV radiators (3) and thereby cleaning them.

5. The apparatus according to claim 1, wherein the container (1) is closed with a cover plate (15) on which all UV radiators (3) are mounted.

6. The apparatus according to claim 4, wherein the container (1) is closed with a cover plate (15) on which the drive mechanism (14) is mounted.

* * * * *